United States Patent
Hattori et al.

(10) Patent No.: US 11,948,471 B2
(45) Date of Patent: Apr. 2, 2024

(54) LEARNING SUPPORT APPARATUS, LEARNING SUPPORT METHOD, AND PROGRAM

(71) Applicant: NIPPON TELEGRAPH AND TELEPHONE CORPORATION, Tokyo (JP)

(72) Inventors: Takashi Hattori, Tokyo (JP); Sanae Fujita, Tokyo (JP); Yoshinari Shirai, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/782,554

(22) PCT Filed: Dec. 10, 2019

(86) PCT No.: PCT/JP2019/048173
§ 371 (c)(1),
(2) Date: Jun. 3, 2022

(87) PCT Pub. No.: WO2021/117114
PCT Pub. Date: Jun. 17, 2021

(65) Prior Publication Data
US 2023/0005386 A1    Jan. 5, 2023

(51) Int. Cl.
*G09B 19/06* (2006.01)
*G06F 16/33* (2019.01)
*G06F 16/332* (2019.01)
*G09B 7/02* (2006.01)

(52) U.S. Cl.
CPC ......... *G09B 19/06* (2013.01); *G06F 16/3329* (2019.01); *G06F 16/3344* (2019.01); *G09B 7/02* (2013.01)

(58) Field of Classification Search
CPC ....... G09B 19/06; G09B 7/02; G06F 16/3344; G06F 16/3329
See application file for complete search history.

(56) References Cited

U.S. PATENT DOCUMENTS

2007/0172809 A1* 7/2007 Gupta .................. G09B 3/00 434/350

OTHER PUBLICATIONS

Mouri et al. (2018) "Supporting Teaching/Learning with Automatically Generated Quiz System," World Conference on e-Learning, Las Vegas, NV, United States, Oct. 15-18, 2018.

* cited by examiner

*Primary Examiner* — Robert J Utama

(57) ABSTRACT

Provided is a learning assistance technology that uses a learning history to check the level of comprehension by a learner in relation to a learning target. Included are a score calculation unit that uses a first occurrence ratio α(n) of a learning target Q(n) calculated using an occurrence frequency R(n) of the learning target Q(n) in a document to be used as a basis for creating a confirmation question and a second occurrence ratio β(n) of the learning target Q(n) weighted by viewing time and calculated using the occurrence frequency R(n) of the learning target Q(n) and a viewing time for each page of the document included in a learning history to calculate one of the difference between the first occurrence ratio α(n) and the second occurrence ratio β(n), the absolute value of the difference, or the ratio as a score S(n) of the learning target Q(n), and a query generation unit that treats the learning target Q(n) corresponding to the n for which the score S(n) is maximized as a query, that is, the learning target with which to create a confirmation question for a learner.

12 Claims, 10 Drawing Sheets

LEARNING SUPPORT APPARATUS, LEARNING SUPPORT METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/048173, filed on 10 Dec. 2019, the disclosure of which is hereby incorporated herein by reference in its entirety.

TECHNICAL FIELD

The present inventions relates to a technology that provides English learning assistance.

BACKGROUND ART

According to a revision in the Japanese government's official guidelines for school teaching, starting in 2020, experience-based learning called "foreign language activities" will start from the third grade of elementary school, and English will be introduced as a graded subject from the fifth grade. The current revision means that English education will begin from an earlier age, and it is thought that more detailed English learning assistance compared to the past will be necessary.

To make progress in English learning, it is important to check whether items of study, such as vocabulary and grammar, have been adequately learned. In the past, the learning state has been checked through various confirmation questions such as regular exams conducted at the end of each semester or the like, quizzes given during class, and study drills used at home. These questions are designed to be used by many children/students simultaneously, and are not customized for individual children/students. However, because there are individual variations in rates of learning, depending on the child/student, confirmation questions prepared in advance may not be suitable for checking the learning state. This issue will be described specifically. Questions that are too easy are considered unsuitable as confirmation questions. This is because such questions may lead to problems such as lower motivation and reduced confidence in the teaching materials. On the other hand, questions that are too difficult are also considered unsuitable as confirmation questions. This is because the child/student may not understand the question even after reading the solution or explanation, and simply memorize the answer or the like, which may lead to a state different from comprehension. In this case, even if study progresses further and the child/student is able to produce the correct answers at an appropriate time for answering questions, it may be difficult to distinguish whether the child/student has memorized the questions or actually absorbed the item of study.

Recently, IT equipment such as tablet PCs are being distributed to individual children/students, and an environment enabling children/students to use electronic textbooks and electronic drills is coming together. In such an environment, software such as Moodle/Bookroll/Analysis Tool (see Non-Patent Reference Literature 1) may be used to acquire a log of how children/students view a textbook and answer questions as a learning history.

(Non-Patent Reference Literature 1: "information infrastructure for supporting education and learning by using educational big data: Moodle/Bookroll/Analysis Tool", [online], [retrieved 26 Nov. 2019], Internet <URL: http://eds.let.media.kyoto-u.ac.jp/?page_id=1065>)

Furthermore, research and development into a learning assistance system based on a learning history acquired by IT equipment is also advancing. As an example, the learning assistance system according to Non-Patent Literature 1 will be described.

(1) A student studies by viewing an electronic textbook provided by the learning assistance system.

(2) The student highlights passages in the electronic textbook that he or she thinks are important. Here, highlighting refers to a process that corresponds to using a highlighter to emphasize English words in a paper textbook.

(3) After studying ends, the learning assistance system generates a portion of the textbook in which the portions highlighted by the student are hidden. The question of filling in the hidden portions acts as confirmation questions.

(4) By answering the confirmation questions in (3), the student's memorization and retention of the important portions in the electronic textbook are promoted.

CITATION LIST

Non-Patent Literature

Non-Patent Literature 1: Kousuke Mouri, Noriko Uosaki, Mohammad Nehal Hasnine, Atsushi Shimada, Chengjiu Yin, Keiichi Kaneko, Hiroaki Ogata, "Supporting Teaching/Learning with Automatically Generated Quiz System," World Conference on e-Learning, 2018.

SUMMARY OF THE INVENTION

Technical Problem

With the learning assistance system described in Non-Patent Literature 1, learning assistance is possible with respect to the portions that the student thinks are important and highlights him- or herself. However, learning assistance is not possible with respect to overlooked portions that the student does not highlight him- or herself. In other words, there is a problem of being unable to check the level of comprehension with respect to vocabulary and grammatical items (hereinafter referred to as learning targets) that are included in the area of study but not intentionally marked by the learner.

Accordingly, an object of the present invention is to provide a learning assistance technology that uses a learning history to check the level of comprehension by a learner in relation to a learning target.

Means for Solving the Problem

One aspect of the present invention includes:
a recording unit that records an English document database including information for identifying a document (hereinafter referred to as a document ID), a document corresponding to the document ID, and one of either a group of a word and an occurrence frequency of the word on each page of the document corresponding to the document ID or a group of a grammatical item and an occurrence frequency of the grammatical item on each page of the document corresponding to the document ID (hereinafter, the word and the grammatical item are referred to as a learning target), and a learning history database including information for identifying a learner (hereinafter referred to as a learner ID), a document ID indicating a document studied by the learner corresponding to the learner ID, and a viewing time for each page of the document corresponding to the document ID viewed by the learner corresponding to the learner ID;

a learning history extraction unit that uses a question creation command including a learner ID indicating a learner for whom to create a confirmation question and a document ID indicating a document to be used as a basis for creating the confirmation question to extract, from the learning history database, the viewing time for each page with a non-zero viewing time from among the viewing times for each page of the document corresponding to the document ID viewed by the learner corresponding to the learner ID as a learning history;

a learning target extraction unit that, provided that $P_k$ (where k=1, ..., K and K is an integer equal to or greater than 1) is the page in the document corresponding to the document ID included in the learning history and $T_k$ (where k=1, ..., K) is the viewing time of the page $P_k$ (where k=1, ..., K) viewed by the learner corresponding to the learner ID, uses the document ID and the pages P1, ..., $P_K$ to extract groups of a learning target Q(n) included on the pages P1, ..., $P_K$ and a corresponding occurrence frequency R(n) (where n=1, ..., N and N is an integer equal to or greater than 1) from the English document database;

a first occurrence ratio calculation unit that uses the groups of the learning target Q(n) and the corresponding occurrence frequency R(n) (where n=1, ..., N) to calculate a first occurrence ratio α(n) of the learning target Q(n) on a basis of

[Math. 1]
$$\alpha(n) = \frac{f(R(n))}{\sum_{n=1}^{N} f(R(n))} \quad (n = 1, \ldots, N)$$

(where f represents a predetermined function for adjusting the occurrence frequency of the learning target);

a second occurrence ratio calculation unit that uses the groups of the learning target Q(n) and the corresponding occurrence frequency R(n) (where n=1, ..., N) and the viewing time $T_k$ (where k=1, ..., K) to calculate a weighted occurrence frequency R'(n) of the learning target Q(n) (where n=1, ..., N) on a basis of

[Math. 2]
$$R'(n) = \sum_{k=1}^{K} R'_k(n)$$
$$R'_k(n) = \begin{cases} R_k(n) \times T_k & (Q(n) \in P_k) \\ 0 & (\text{otherwise}) \end{cases}$$

(where $R_k(n)$ (where k=1, ..., K) is the occurrence frequency of the learning target Q(n) included on the page $P_k$, and $Q(n) \in P_k$ denotes that the learning target Q(n) occurs on the page $P_k$), and calculates a second occurrence ratio β(n) of the learning target Q(n) on a basis of

[Math. 3]
$$\beta(n) = \frac{R'(n)}{\sum_{n=1}^{N} R'(n)} \quad (n = 1, \ldots, N);$$

a score calculation unit that uses the first occurrence ratio α(n) (where n=1, ..., N) and the second occurrence ratio β(n) (where n=1, ..., N) to calculate one of a difference between the first occurrence ratio α(n) and the second occurrence ratio β(n), an absolute value of the difference between the first occurrence ratio α(n) and the second occurrence ratio β(n), or a ratio of the first occurrence ratio α(n) and the second occurrence ratio β(n) as a score S(n) of the learning target Q(n); and a query generation unit that treats the learning target Q(n) corresponding to the n for which the score S(n) (where n=1, ..., N) is maximized as a query.

One aspect of the present invention includes:

a recording unit that records an English document database including information for identifying a document (hereinafter referred to as a document ID), a document corresponding to the document ID, and one of either a group of a word and an occurrence frequency of the word on each page of the document corresponding to the document ID or a group of a grammatical item and an occurrence frequency of the grammatical item on each page of the document corresponding to the document ID (hereinafter, the word and the grammatical item are referred to as a learning target), a learning history database including information for identifying a learner (hereinafter referred to as a learner ID), a document ID indicating a document studied by the learner corresponding to the learner ID, and a viewing time for each page of the document corresponding to the document ID viewed by the learner corresponding to the learner ID, and a learning outcome database including the learner ID and a group of a learning target, a total number of confirmation questions related to the learning target, and a number of questions answered correctly by the learner corresponding to the learner ID from among the confirmation questions;

a learning history extraction unit that uses a question creation command including a learner ID indicating a learner for whom to create a confirmation question and a document ID indicating a document to be used as a basis for creating the confirmation question to extract, from the learning history database, the viewing time for each page with a non-zero viewing time from among the viewing times for each page of the document corresponding to the document ID viewed by the learner corresponding to the learner ID as a learning history;

a learning target extraction unit that, provided that $P_k$ (where k=1, ..., K and K is an integer equal to or greater than 1) is the page in the document corresponding to the document ID included in the learning history and $T_k$ (where k=1, ..., K) is the viewing time of the page $P_k$ (where k=1, ..., K) viewed by the learner corresponding to the learner ID, uses the document ID and the pages P1, ..., $P_K$ to extract groups of a learning target Q(n) included on the pages P1, ..., $P_K$ and a corresponding occurrence frequency R(n) (where n=1, ..., N and N is an integer equal to or greater than 1) from the English document database;

a first occurrence ratio calculation unit that uses the groups of the learning target Q(n) and the corresponding occurrence frequency R(n) (where n=1, ..., N) to calculate a first occurrence ratio α(n) of the learning target Q(n) on a basis of

[Math. 4]

$$\alpha(n) = \frac{f(R(n))}{\sum_{n=1}^{N} f(R(n))} \quad (n = 1, \ldots, N)$$

(where f represents a predetermined function for adjusting the occurrence frequency of the learning target);
a second occurrence ratio calculation unit that uses the groups of the learning target Q(n) and the corresponding occurrence frequency R(n) (where n=1, ..., N) and the viewing time $T_k$ (where k=1, ..., K) to calculate a weighted occurrence frequency R'(n) of the learning target Q(n) (where n=1, ..., N) on a basis of

[Math. 5]

$$R'(n) = \sum_{k=1}^{K} R'_k(n)$$

$$R'_k(n) = \begin{cases} R_k(n) \times T_k & (Q(n) \in P_k) \\ 0 & (\text{otherwise}) \end{cases}$$

(where $R_k(n)$ (where k=1, ..., K) is the occurrence frequency of the learning target Q(n) included on the page $P_k$, and $Q(n) \in P_k$ denotes that the learning target Q(n) occurs on the page $P_k$), and calculates a second occurrence ratio β(n) of the learning target Q(n) on a basis of

[Math. 6]

$$\beta(n) = \frac{R'(n)}{\sum_{n=1}^{N} R'(n)} \quad (n = 1, \ldots, N);$$

a score calculation unit that uses the first occurrence ratio α(n) (where n=1, ..., N) and the second occurrence ratio β(n) (where n=1, ..., N) to calculate one of a difference between the first occurrence ratio α(n) and the second occurrence ratio β(n), an absolute value of the difference between the first occurrence ratio α(n) and the second occurrence ratio β(n), or a ratio of the first occurrence ratio α(n) and the second occurrence ratio β(n) as a score S(n) of the learning target Q(n);
a probability calculation unit that uses the learning outcome database to calculate an error probability E(n) of the learning target Q(n) (where n=1, ..., N) from the learner ID and the learning target Q(n) (where n=1, ..., N), and calculates a probability Pr(n) (where n=1, ..., N) of selecting the learning target Q(n) as a query on a basis of

[Math. 7]

$$Pr(n) = \frac{S(n) \times E(n)}{\sum_{n=1}^{N} S(n) \times E(n)} \quad (n = 1, \ldots, N);$$

and
a query generation unit that treats the learning target selected according to the probability Pr(n) (where n=1, ..., N) as a query.

Effects of the Invention

According to the present invention, it is possible to use a learning history to check the level of comprehension by a learner in relation to a learning target.

DESCRIPTION OF EMBODIMENTS

Hereinafter, embodiments of the present invention will be described in detail. Note that structural elements having the same function are denoted with the same signs, and duplicate description of such elements is omitted.

Before describing each embodiment, the notation system used in this specification will be explained.

An underscore (_) denotes subscript. For example, $x^{y\_z}$ indicates that $y_z$ is a superscript of x, and $x_{y\_z}$ indicates that $y_z$ is a subscript of x.

Also, a superscript character "^" or "~" preceding a certain character x, like ^x or ~x, should be written directly above "x", but is denoted as ^x or ~x due to the typographic constraints of the specification.

First Embodiment

A learning assistance apparatus 100 assists with the study of an English document (for example, a textbook or a book of English literature) by a learner. More specifically, the learning assistance apparatus 100 assists with the generation of questions for confirming a learning outcome (hereinafter referred to as confirmation questions) using a learning history related to the English document studied by the learner.

Figure 1:
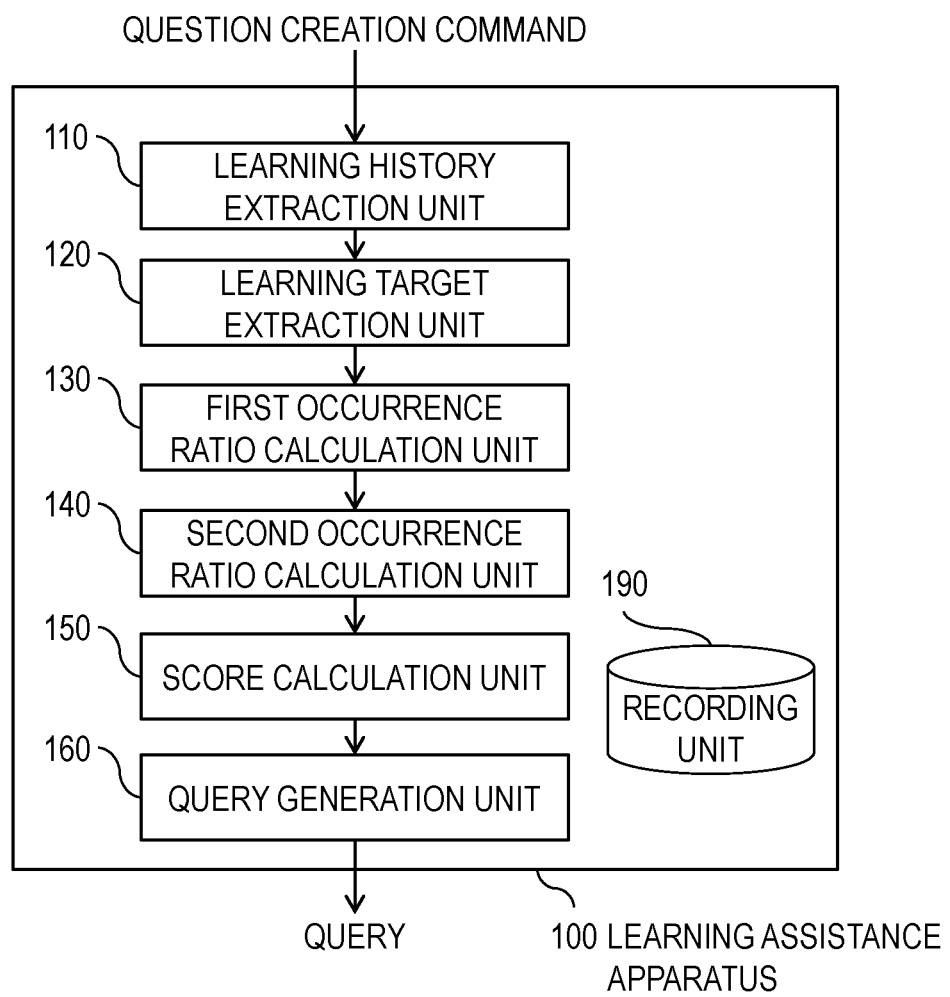
FIG. 1 is a block diagram illustrating a configuration of a learning assistance apparatus 100.
Figure 2:
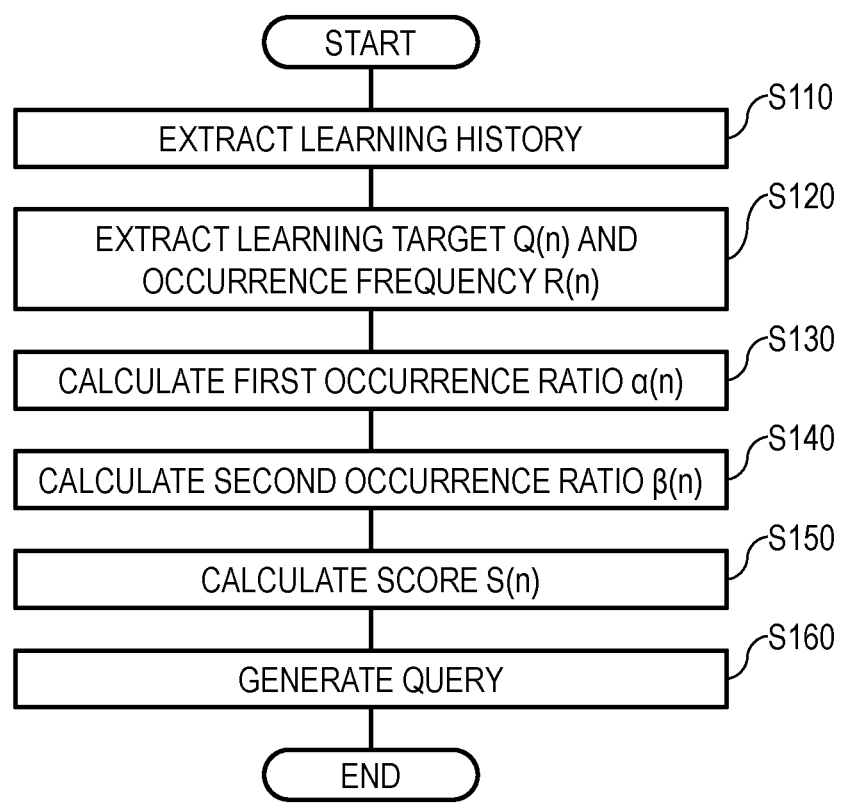
FIG. 2 is a flowchart illustrating operations by the learning assistance apparatus 100.

Hereinafter, the learning assistance apparatus 100 will be described with reference to FIGS. 1 and 2. FIG. 1 is a block diagram illustrating a configuration of the learning assistance apparatus 100. FIG. 2 is a flowchart illustrating operations by the learning assistance apparatus 100. As illustrated in FIG. 1, the learning assistance apparatus 100 includes a learning history extraction unit 110, a learning target extraction unit 120, a first occurrence ratio calculation unit 130, a second occurrence ratio calculation unit 140, a score calculation unit 150, a query generation unit 160, and a recording unit 190. The recording unit 190 is a component that appropriately records information necessary for processes by the learning assistance apparatus 100.

An English document database is recorded in the recording unit 190 before the start of learning assistance. Here, the English document database includes information for identifying a document (hereinafter referred to as a document ID), the document corresponding to the document ID, and one of either a group of a word and an occurrence frequency of the word on each page of the document corresponding to the document ID or a group of a grammatical item and an occurrence frequency of the grammatical item on each page of the document corresponding to the document ID. Hereinafter, words and grammatical items will be referred to as learning targets. In other words, an English document that the learner needs to learn is recorded together with groups of words occurring in the English document and the occurrence frequency of the words in the English document, or with grammatical items occurring in the English document and the occurrence frequency of the grammatical items in the English document, as an English document database.

Words and their occurrence frequency can be extracted as text information from a document in English treated as what is called natural language by using a program known as a lemmatizer that divides inputted English text into lemmas, for example. Here, a lemma refers to the base form of a word that may be found in a dictionary. For example, the lemma of feet is foot. If a type of lemmatizer known as the TreeTagger is used, the sequence of base-form English words "this, be, a, pen" can be generated from the sentence "This is a pen." Accordingly, for example, a set of tabular data in which document information is collected into rows and the occurrence frequencies of the base forms of words are collected into columns for each page may be treated as the English document database. Note that the occurring form may also be recorded together with the base form.

Also, grammatical items refer to grammatical constructions that may be treated as units of learning in English study, such as prepositions and passive tense. For example, the grammatical items in CEFR-J (see Non-Patent Reference Literature 2) may be used. Additionally, if the list of regular expressions for extraction in Non-Patent Reference Literature 2 are used, grammatical items and their occurrence frequency can be extracted from an English document.
(Non-Patent Reference Literature 2: "Grammatical Item List Version: 20180315", [online], [retrieved 26 Nov. 2019], Internet <URL: http://cefr-j.org/sympo2018/pdf/CEFRJGP_GRAMMATICAL_ITEM_LIST.pdf#back)

Here, the merits of using grammatical items to confirm a learning outcome will be described. In the case of using English words, it is not possible to confirm whether a learner understands that the two consecutive English words "have to" fulfill the "role of an auxiliary verb meaning "it is necessary to do . . . " similarly to must". However, in the case of using grammatical items, it is possible to examine and record in the English document database how many times the grammatical item "auxiliary verb (have to)" appears in certain sentences, and create confirmation questions regarding "have to" in addition to confirmation questions regarding "must", on the grounds that "must" and "have to" are semantically synonymous. However, for beginners such as lower elementary children/students, there is a possibility that additionally teaching the synonymous "have to" when first encountering "must" may be counterproductive, and therefore it is preferable to create confirmation questions like the above for learners who have advanced in their studies to some degree. The description herein uses a "synonymous" relationship, but confirmation questions may also be created for more advanced learners by using a relationship that holds between two grammatical items, such as an "antonymous relationship" such as imperative statements and negative imperative statements, or "a basic form and variations thereof" such as the present tense, past tense, and future tense. Furthermore, the above is not limited to relationships that hold between two grammatical items, and confirmation questions may also be created by using a relationship that holds among three or more grammatical items.

Additionally, a learning history database is recorded in the recording unit 190 after the start of learning assistance. Here, the learning history database includes information for identifying a learner (hereinafter referred to as a learner ID), a document ID indicating a document studied by the learner corresponding to the learner ID, and a viewing time for each page of the document corresponding to the document ID viewed by the learner corresponding to the learner ID. In other words, a history of how much the learner has read which pages of which English document is recorded as the learning history database.

Figure 3:
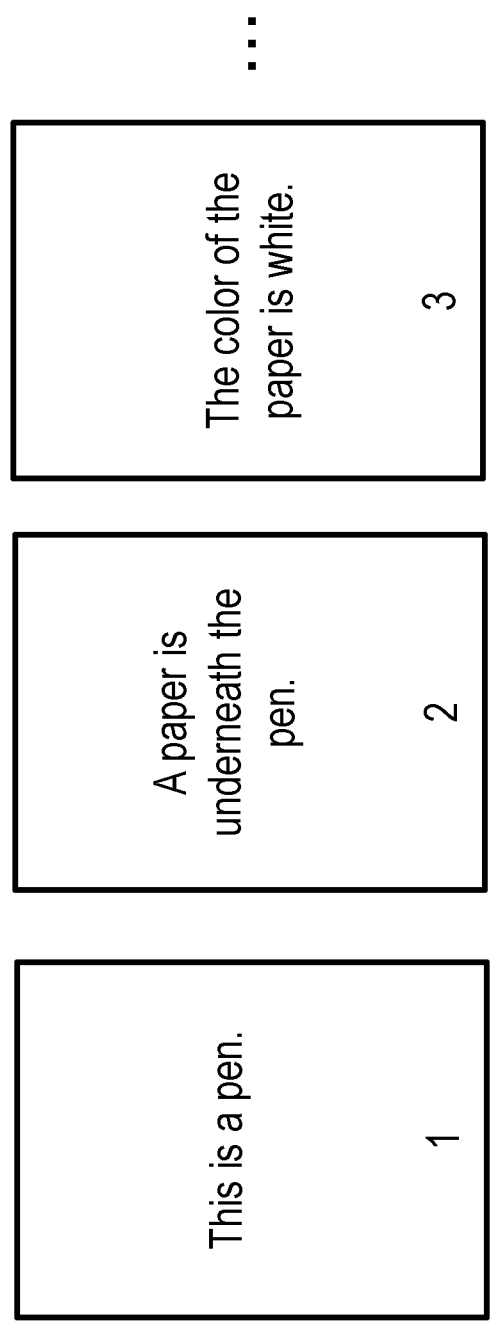
FIG. 3 is a diagram illustrating an example of a document.

Operations by the learning assistance apparatus 100 will be described in accordance with FIG. 2. The following description assumes that information related to the document in FIG. 3, specifically the words and their occurrence frequencies, are recorded in the English document database. The document in FIG. 3 is very simple, and includes one English sentence on each page from page 1 to page 3. A colon ":" is used to express the link in a group of a word and its occurrence frequency, such that "this: 1, be: 1, a: 1, pen: 1" is recorded as information related to page 1, "a: 1, paper: 1, be: 1, underneath: 1, the: 1, pen: 1" is recorded as information related to page 2, and "the: 2, color: 1, of: 1, paper: 1, be: 1, white: 1" is recorded as information related to page 3.

Also, a question creation command acting as the input of the learning assistance apparatus 100 includes at least a learner ID indicating the learner for whom confirmation questions are created and a document ID indicating the document to be treated as the basis for creating the confirmation questions.

In S110, the learning history extraction unit 110 receives a question creation command including a learner ID indicating the learner for whom confirmation questions are created and a document ID indicating the document to be treated as the basis for creating the confirmation questions as input, and uses the question creation command to extract and output, from the learning history database, the viewing time for each page with a non-zero viewing time from among the viewing times for each of the pages of the document corresponding to the document ID viewed by the learner corresponding to the learner ID as a learning history. Hereinafter, let $P_k$ (where k=1, ..., K and K is an integer equal to or greater than 1) be the page in the document corresponding to the document ID included in the learning history, and let $T_k$ (where k=1, ..., K) be the viewing time of the page $P_k$ (where k=1, ..., K) viewed by the learner corresponding to the learner ID. Assuming that the learner has studied each page from page 1 to page 3 of the document in FIG. 3, and the viewing time of each of the pages is 1 second, 7 seconds, and 2 seconds, respectively, then $P_1$=1, $P_2$=2, $P_3$=3, $T_1$=1, $T_2$=7, and $T_3$=2.

Figure 4:
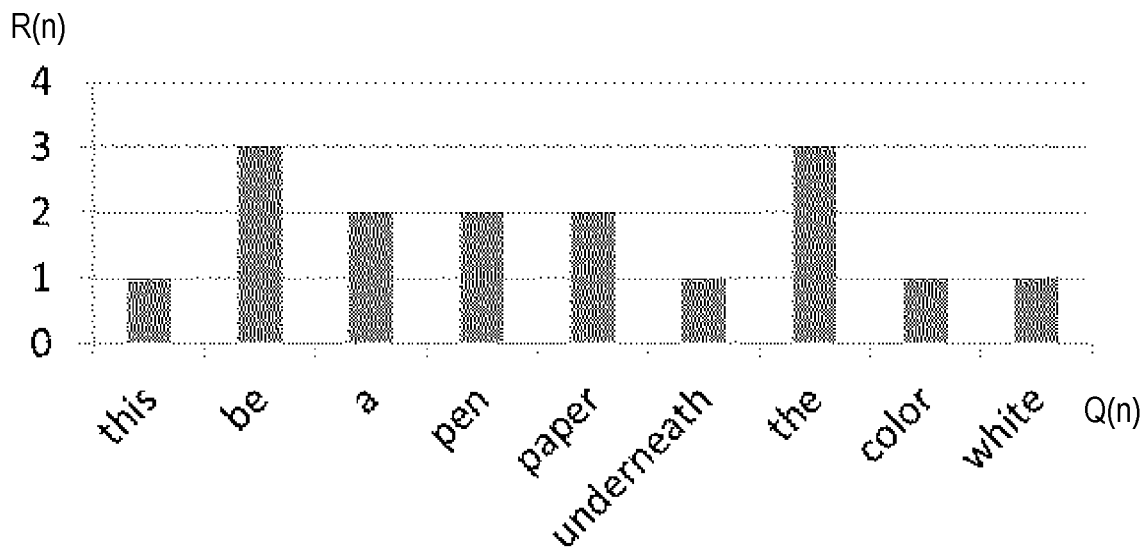
FIG. 4 is a diagram illustrating an example of groups of a learning target Q(n) and a corresponding occurrence frequency R(n).

In S120, the learning target extraction unit 120 receives the document ID included in the question creation command and the learning history extracted in S110 as input, and uses the document ID and the pages $P_1, \ldots, P_K$ to extract and output groups of a learning target Q(n) included on the pages $P_1, \ldots, P_K$ and a corresponding occurrence frequency R(n) (where n=1, ..., N and N is an integer equal to or greater than 1) from the English document database. FIG. 4 illustrates an example of groups of the learning target Q(n) and the corresponding occurrence frequency R(n). In this example, the words and their occurrence frequencies from page 1 to page 3 of the document in FIG. 3 are collected, such that N=9, Q(1)="this", and R(1)=1.

In S130, the first occurrence ratio calculation unit 130 receives the groups of the learning target Q(n) and the corresponding occurrence frequency R(n) (where n=1, ..., N) extracted in S120 as input, and uses the groups of the learning target Q(n) and the corresponding occurrence frequency R(n) (where n=1, ..., N) to calculate and output a first occurrence ratio α(n) of the learning target Q(n) on the basis of the following expression.

[Math. 8]

$$\alpha(n) = \frac{R(n)}{\sum_{n=1}^{N} R(n)} \quad (n = 1, \ldots, N) \tag{a}$$

In other words, the first occurrence ratio α(n) is the occurrence frequency when the total occurrence frequency is normalized to 1.

Note that the first occurrence ratio α(n) may also be calculated on the basis of the following expression.

[Math. 9]

$$\alpha(n) = \frac{f(R(n))}{\sum_{n=1}^{N} f(R(n))} \quad (n = 1, \ldots, N)$$

In the above, f represents a predetermined function for adjusting the occurrence frequency of the learning target.

Hereinafter, several examples of the function f will be described. For example, in the case of a document in which specific words occur repeatedly, such as a picture book, a value obtained by multiplying R(n) by a predetermined constant γ less than 1 may be used instead of R(n) as in Expression (b), or R(n) may be substituted with a constant θ when R(n) is equal to or greater than the constant as in Expression (c).

[Math. 10]

$$f(R(n)) = \gamma * R(n) \tag{b}$$

$$f(R(n)) = \begin{cases} R(n) & (R(n) < \theta) \\ \theta & (R(n) \geq \theta) \end{cases} \tag{c}$$

Also, in consideration of typical occurrence frequencies, a value obtained by adding a constant δ to R(n) may also be used instead of R(n) as in Expression (d).

[Math. 11]

$$f(R(n)) = R(n) + \delta \tag{d}$$

Furthermore, a constant θ' that acts as a cutoff for the value of R(n) may be set as in Expression (e), or the logarithm of R(n) may be used to lessen the influence in cases where the value of R(n) is too large as in Expression (f).

[Math. 12]

$$f(R(n)) = \begin{cases} 0 & (R(n) < \theta') \\ R(n) & (R(n) \geq \theta') \end{cases} \tag{e}$$

$$f(R(n)) = \log(R(n)) \tag{f}$$

Note that if the function f is assumed to be the identity function in the above expressions, the result is Expression (a).

Figure 5:
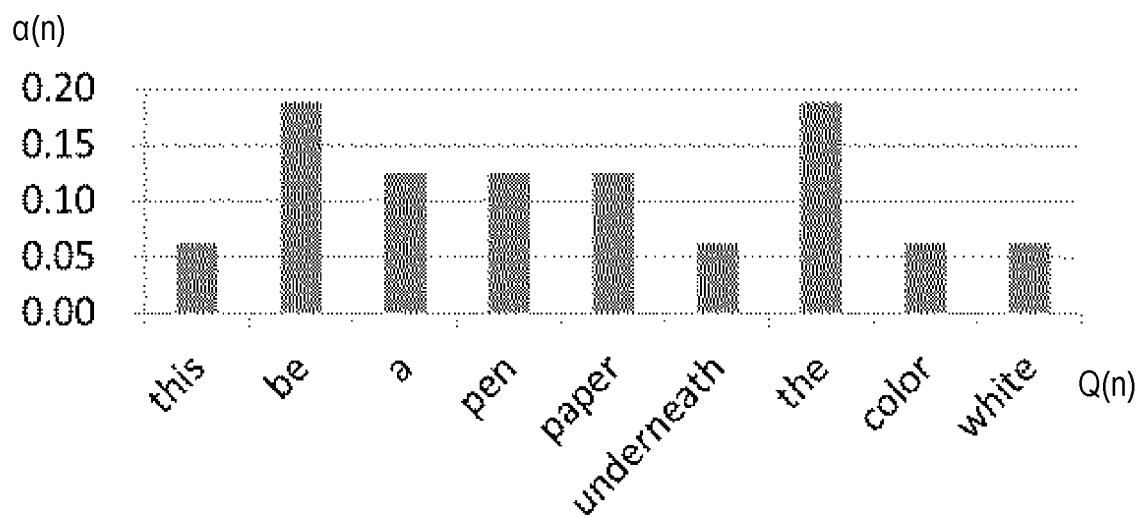
FIG. 5 is a diagram illustrating an example of groups of the learning target Q(n) and a corresponding first occurrence ratio α(n).

FIG. 5 illustrates an example of groups of the learning target Q(n) and the corresponding first occurrence ratio α(n). In this example, groups of the words and their normalized occurrence frequencies from page 1 to page 3 of the document in FIG. 4 are collected, such that N=9, Q(1)="this", and α(1)=0.0625.

In S140, the second occurrence ratio calculation unit 140 receives the groups of the learning target Q(n) and the corresponding occurrence frequency R(n) (where n=1, ..., N) extracted in S120 and the viewing time $T_k$ (where k=1, ..., K) included in the learning history extracted in S110 as input, and uses the groups of the learning target Q(n) and the corresponding occurrence frequency R(n) (where n=1, ..., N) and the viewing time $T_k$ (where k=1, ..., K) to calculate a weighted occurrence frequency R'(n) of the learning target Q(n) (where n=1, ..., N) on the basis of the following expression.

[Math. 13]

$$R'(n) = \sum_{k=1}^{K} R'_k(n)$$

$$R'_k(n) = \begin{cases} R_k(n) \times T_k & (Q(n) \in P_k) \\ 0 & (\text{otherwise}) \end{cases}$$

In the above, $R_k$(n) (where k=1, ..., K) is the occurrence frequency of the learning target Q(n) included on the page $P_k$, and Q(n)∈$P_k$ denotes that the learning target Q(n) occurs on the page $P_k$. Thereafter, the second occurrence ratio calculation unit 140 calculates and outputs a second occurrence ratio β(n) of the learning target Q(n) on the basis of the following expression.

[Math. 14]
$$\beta(n) = \frac{R'(n)}{\sum_{n=1}^{N} R'(n)} \quad (n = 1, \ldots, N)$$

Here, from the definition of $R_k(n)$, the following expression holds.

$$R(n) = \sum_{k=1}^{K} R_k(n) \quad \text{[Math. 15]}$$

Figure 6:
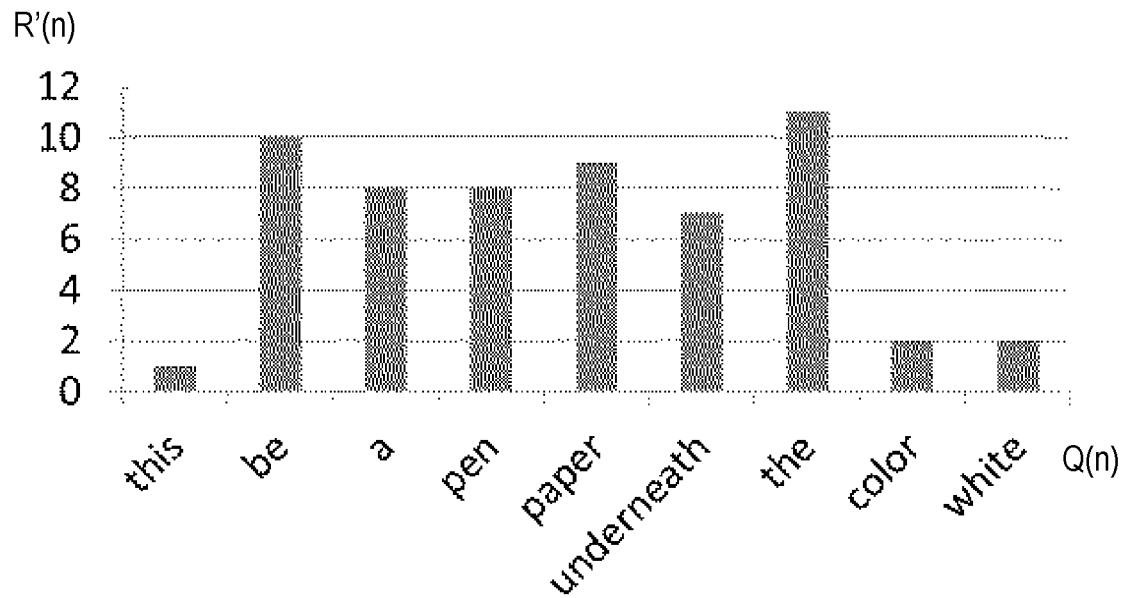
FIG. 6 is a diagram illustrating an example of groups of the learning target Q(n) and a corresponding weighted occurrence frequency R'(n).
Figure 7:
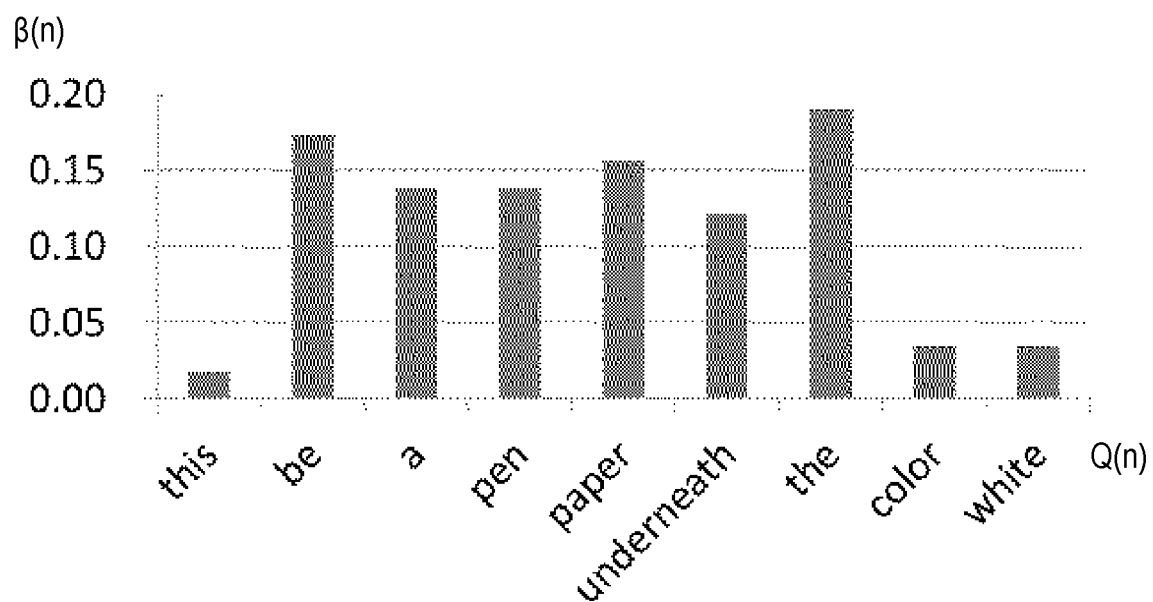
FIG. 7 is a diagram illustrating an example of groups of the learning target Q(n) and a corresponding second occurrence ratio β(n).

FIG. 6 illustrates an example of groups of the learning target Q(n) and the corresponding weighed occurrence frequency R'(n). Also, FIG. 7 illustrates an example of groups of the learning target Q(n) and the corresponding second occurrence ratio β(n).

In S150, the score calculation unit 150 receives the first occurrence ratio α(n) (where n=1, ..., N) calculated in S130 and the second occurrence ratio β(n) (where n=1, ..., N) as input, and uses the first occurrence ratio α(n) (where n=1, ..., N) and the second occurrence ratio β(n) (where n=1, ..., N) to calculate and output the difference between the first occurrence ratio α(n) and the second occurrence ratio β(n) as a score S(n) of the learning target Q(n). Note that the score calculation unit 150 may calculate the score S(n) as S(n)=β(n)−α(n), or calculate the score S(n) as S(n)=α(n)−β(n). Also, instead of the difference, the absolute value of the difference or the ratio may be used. In other words, the score calculation unit 150 may calculate the score S(n) as S(n)=|β(n)−α(n)|, or calculate the score S(n) as S(n)=β(n)/α(n) or S(n)=α(n)/β(n).

In S160, the query generation unit 160 receives the learning target Q(n) (where n=1, ..., N) extracted in S120 and the score S(n) (where n=1, ..., N) calculated in S150 as input, treats the learning target Q(n) corresponding to the n for which the score S(n) (where n=1, ..., N) is maximized as a query and outputs the query. In the case where the score S(n) is calculated as S(n)=β(n)−α(n), it is possible to query the learning target having a large difference in the ratio at which the learning target occurs in the document, or in other words, the learning target that the learner has scrutinized (or that the learner has been concerned about) compared to the ratio of occurrence. On the other hand, in the case where the score S(n) is calculated as S(n)=α(n)−β(n), it is possible to query the learning target that the learner has not scrutinized (or that the learner has not been concerned about), or in other words, the learning target that occurs frequently in the document but has not been noticed by the learner. Note that in the case where the score S(n) is calculated as S(n)=|β(n)−α(n)|, it is possible to query both the learning target that the learner has scrutinized and the learning target that the learner has not scrutinized compared to the ratio of occurrence.

Figure 8:
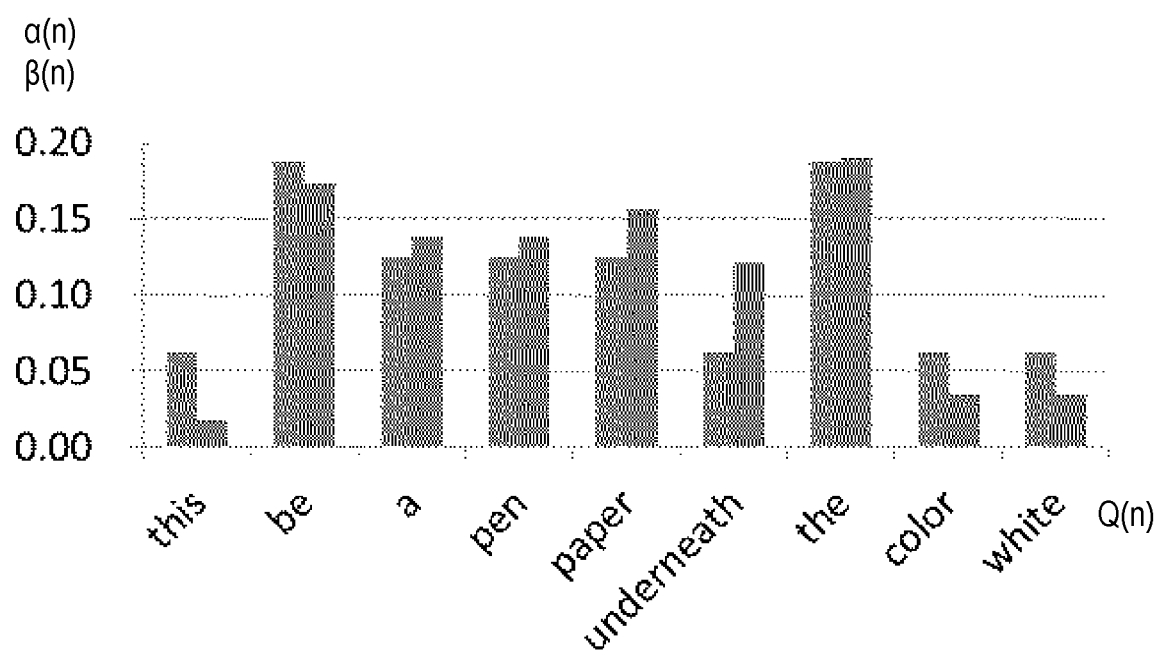
FIG. 8 is a diagram illustrating an example of groups of the learning target Q(n), the first occurrence ratio α(n), and the second occurrence ratio β(n).

FIG. 8 illustrates an example of groups of the learning target Q(n), the first occurrence ratio α(n), and the second occurrence ratio β(n), in which the first occurrence ratio α(n) and the second occurrence ratio β(n) are displayed side by side with respect to the learning target Q(n) (here, the first occurrence ratio α(n) is on the left and the second occurrence ratio β(n) is on the right). The score S(n)=β(n)−α(n) treated as the difference between the first occurrence ratio α(n) and the second occurrence ratio β(n) is maximized for "underneath" when n=6, and "underneath" is returned as the query. Even in the case of using S(n)=|β(n)−α(n)| or S(n)=β(n)/α(n) as the score instead of S(n)=β(n)−α(n), the score is maximized for "underneath" when n=6, and "underneath" is returned as the query.

According to the embodiment of the present invention, it is possible to use a learning history to check the level of comprehension by a learner in relation to a learning target. By using the learning history, questions tailored to the learning state of the learner can be used as confirmation questions instead of questions designed for general learners. In particular, learning assistance can be provided for learning targets that the learner has overlooked. By using questions tailored to the learning states of individual learners, improved learning outcomes are anticipated.

Second Embodiment

A learning assistance apparatus 200 assists with the study of an English document by a learner, similarly to the learning assistance apparatus 100. In the learning assistance apparatus 100 only the learning history database is used in relation to the learning state of the learner, but in the learning assistance apparatus 200, a database recording the results, such as correct/incorrect, of the learner answering questions is also used in addition to the learning history database.

Figure 9:
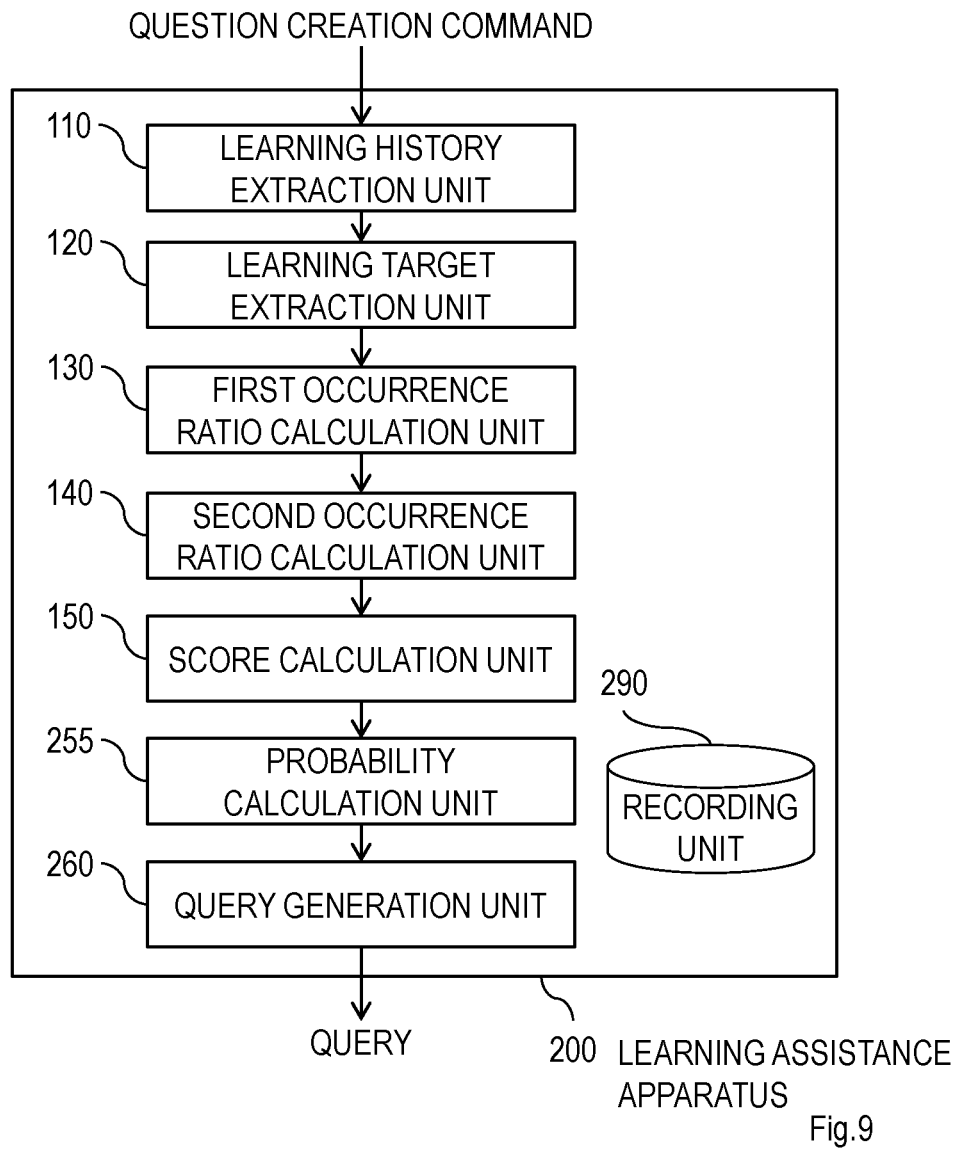
FIG. 9 is a block diagram illustrating a configuration of a learning assistance apparatus 200.
Figure 10:
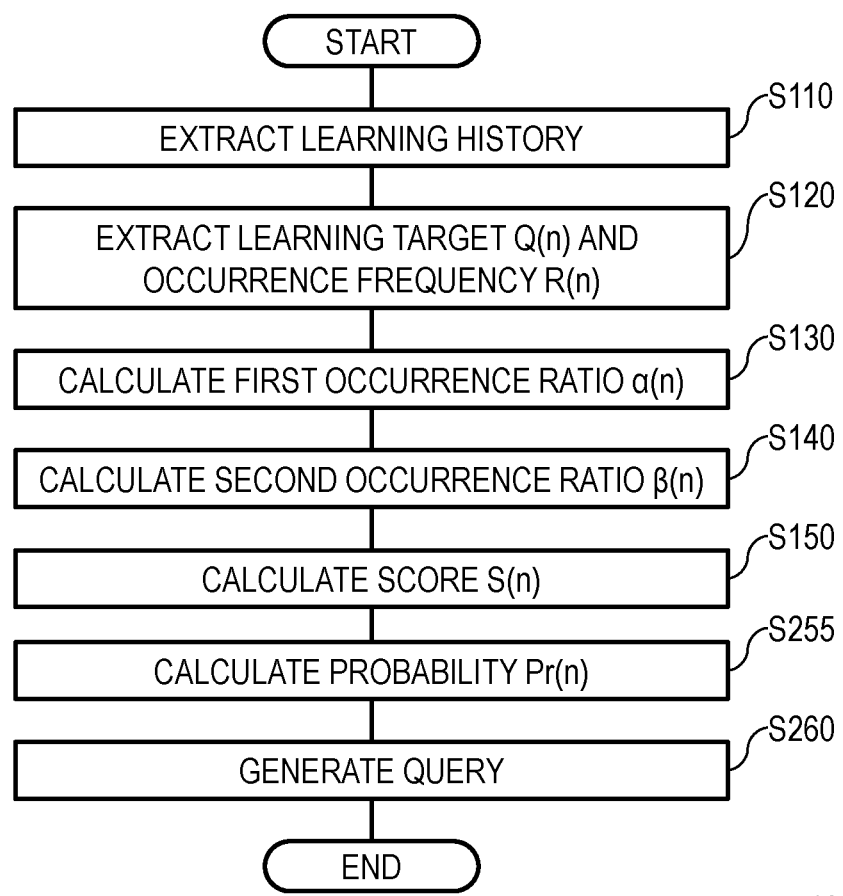
FIG. 10 is a flowchart illustrating operations by the learning assistance apparatus 200.

Hereinafter, the learning assistance apparatus 200 will be described with reference to FIGS. 9 and 10. FIG. 9 is a block diagram illustrating a configuration of the learning assistance apparatus 200. FIG. 10 is a flowchart illustrating operations by the learning assistance apparatus 200. As illustrated in FIG. 9, the learning assistance apparatus 200 includes a learning history extraction unit 110, a learning target extraction unit 120, a first occurrence ratio calculation unit 130, a second occurrence ratio calculation unit 140, a score calculation unit 150, a probability calculation unit 255, a query generation unit 260, and a recording unit 290. The recording unit 290 is a component that appropriately records information necessary for processes by the learning assistance apparatus 200. An English document database and a learning history database are recorded in the recording unit 290, similarly to the recording unit 190. Additionally, a learning outcome database is recorded in the recording unit 290 after the start of learning assistance. Here, the learning outcome database includes a learner ID and a group of a learning target, the total number of confirmation questions related to the learning target, and the number of questions answered correctly by the learner corresponding to the learner ID from among the confirmation questions.

Operations by the learning assistance apparatus 200 will be described in accordance with FIG. 10. Because the process from S110 to S150 is similar to the process by the learning assistance apparatus 100, the process from S255 will be described hereinafter.

In S255, the probability calculation unit 255 receives the learner ID included in the question creation command, the learning target Q(n) (where n=1, ..., N) extracted in S120, and the score S(n) (where n=1, ..., N) calculated in S150 as input, uses the learning outcome database to calculate an error probability E(n) of the learning target Q(n) (where n=1, ..., N) from the learner ID and the learning target Q(n) (where n=1, ..., N), and calculates and outputs a probability Pr(n) (where n=1, ..., N) of selecting the learning target Q(n) as a query on the basis of the following expression.

[Math. 16]
$$Pr(n) = \frac{S(n) \times E(n)}{\sum_{n=1}^{N} S(n) \times E(n)} \quad (n = 1, \ldots, N)$$

The error probability E(n) can be calculated as follows, for example. The probability calculation unit 255 uses the learner ID and the learning target Q(n) (where n=1, ..., N) to extract, from the learning outcome database, a total number A(n) of confirmation questions related to the learning target Q(n) and a number B(n) of questions answered correctly by the learner corresponding to the learner ID from among the confirmation questions, and calculates the error probability E(n)=(A(n)−B(n))/A(n).

In S260, the query generation unit 260 receives the learning target Q(n) (where n=1, ..., N) extracted in S120 and the probability Pr(n) (where n=1, ..., N) calculated in S250 as input, treats the learning target selected according to the probability Pr(n) (where n=1, ..., N) as a query and outputs the query.

By selecting the query according to the probability Pr(n) in this way, learning targets with higher scores are selected more readily, but the same learning target is no longer selected in succession. Consequently, the learner does not become bored of answering the same kinds of confirmation questions one after another.

(Modification)

A different query generation method using the learning outcome database will be described. The learning assistance apparatus 200 according to a modification differs from the learning assistance apparatus 200 according to the embodiment by including a score update unit 256 (not illustrated) and the query generation unit 160 instead of the probability calculation unit 255 and the query generation unit 260. In other words, the learning assistance apparatus 200 according to the modification includes the learning history extraction unit 110, the learning target extraction unit 120, the first occurrence ratio calculation unit 130, the second occurrence ratio calculation unit 140, the score calculation unit 150, the score update unit 256, the query generation unit 160, and the recording unit 290.

Operations by the learning assistance apparatus 200 according to the modification will be described. Because the process from S110 to S150 is similar to the process by the learning assistance apparatus 200, the process from S256 will be described hereinafter.

In S256, the score update unit 256 receives the learner ID included in the question creation command, the learning target Q(n) (where n=1, ..., N) extracted in S120, and the score S(n) (where n=1, ..., N) calculated in S150 as input, uses the learning outcome database to calculate the error probability E(n) of the learning target Q(n) (where n=1, ..., N) from the learner ID and the learning target Q(n) (where n=1, ..., N), and calculates and outputs a score S'(n) (where n=1, ..., N) of the learning target Q(n) on the basis of the following expression.

$$S'(n)=S(n) \times E(n) \ (n=1, \ldots, N) \quad [\text{Math. 17}]$$

In S160, the query generation unit 160 receives the learning target Q(n) (where n=1, ..., N) extracted in S120 and the score S'(n) (where n=1, ..., N) calculated in S256 as input, treats the learning target Q(n) corresponding to the n for which the score S'(n) (where n=1, ..., N) is maximized as a query and outputs the query.

By selecting a query on the basis of the score S'(n) in this way, the score is lowered for learning targets that have appeared often in confirmation questions and have been answered correctly, such that confirmation questions related to well-understood learning targets are no longer created repeatedly. On the other hand, learning targets that have appeared often in confirmation questions but have been answered incorrectly are created as confirmation questions.

According to the embodiment of the present invention, it is possible to use a learning history to check the level of comprehension by a learner in relation to a learning target.

Third Embodiment

The English document database according to the first embodiment and the second embodiment includes one of either groups of words and their occurrence frequency on each page or groups of grammatical items and their occurrence frequency on each page, but may also be configured to include both.

In this case, the English document database includes information for identifying a document (hereinafter referred to as a document ID), a document corresponding to the document ID, a group of a word and the occurrence frequency of the word on each page of the document corresponding to the document ID, and a group of a grammatical item and the occurrence frequency of the grammatical item on each page of the document corresponding to the document ID. Additionally, the question creation command acting as the input of the learning assistance apparatus 100/200 may include the learner ID and the document ID, as well as the designation of a learning target to be included in the query acting as the output of the learning assistance apparatus 100/200 (that is, any of a designation of words, a designation of grammatical items, or a designation of words and grammatical items).

The learning assistance apparatus 100 and the learning assistance apparatus 200 include a control unit (not illustrated) that causes each of the process from S120 to S160 and the process from S120 to S260 to be repeated for each learning target. Here, if a learning target selection unit (not illustrated) is assumed to be a component including the learning target extraction unit 120, the first occurrence ratio calculation unit 130, the second occurrence ratio calculation unit 140, the score calculation unit 150, and the query generation unit 160, or a component including the learning target extraction unit 120, the first occurrence ratio calculation unit 130, the second occurrence ratio calculation unit 140, the score calculation unit 150, the probability calculation unit 255, and the query generation unit 260, the control unit may be considered to be a component that controls the execution of the processes by the learning target selection unit for each learning target.

Note that in the case where the designation of a learning target included in the question creation command is the designation of "words", the query includes only words. Also, in the case where the designation of a learning target included in the question creation command is the designation of "grammatical items", the query includes only grammatical items. Furthermore, in the case where the designation of a learning target included in the question creation command is the designation of "words and grammatical items", the query includes both words and grammatical items.

(Modification)

In the case where the question creation command does not include a designation of a learning target and the case where the designation of a learning target included in the question creation command is words and grammatical items, the learning assistance apparatus 100 may also be configured to include a learning history extraction unit 110, a learning target extraction unit 120, a first occurrence ratio calculation unit 130, a second occurrence ratio calculation unit 140, and a score calculation unit 150, as well as a query generation unit 160 that treats the word or grammatical item for which the score calculated for a word or the score calculated for a grammatical item is maximized as the query and a control unit (not illustrated) that causes the process from S120 to S150 to be repeated for each learning target. The query generation unit 160 in this case receives the scores related to words and the scores related to grammatical items calculated in S150 as input, treats the learning target (a word or a grammatical item) with the maximum score from among the scores as the query, and outputs the query.

According to the embodiment of the present invention, it is possible to use a learning history to check the level of comprehension by a learner in relation to a learning target.

Fourth Embodiment

The learning assistance apparatus according to the present embodiment generates confirmation questions by using a query generated by the learning assistance apparatus 100/200.

Figure 11:
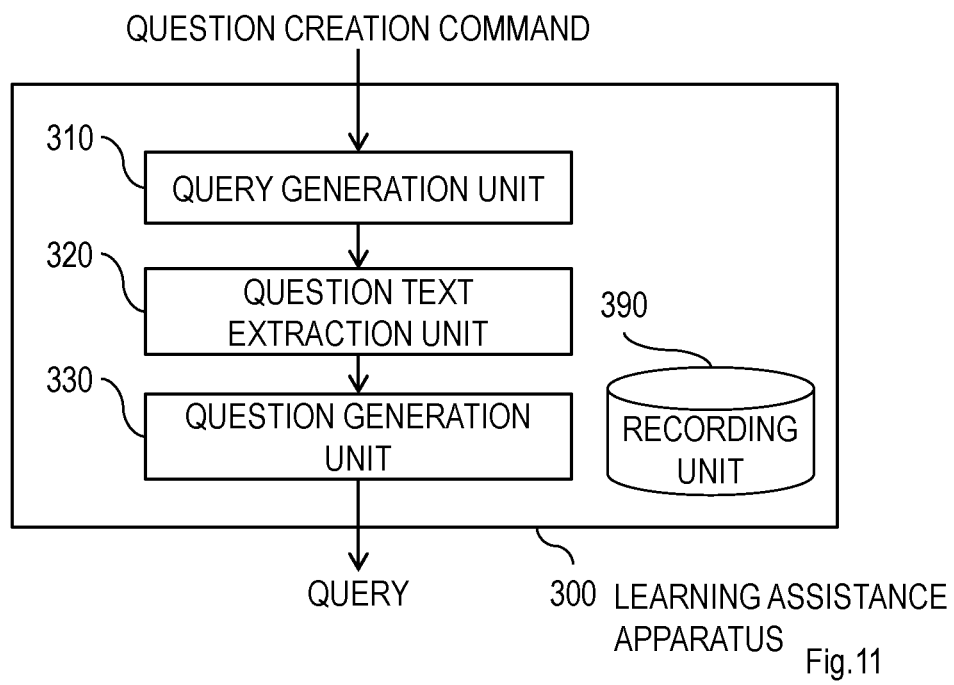
FIG. 11 is a block diagram illustrating a configuration of a learning assistance apparatus 300.
Figure 12:
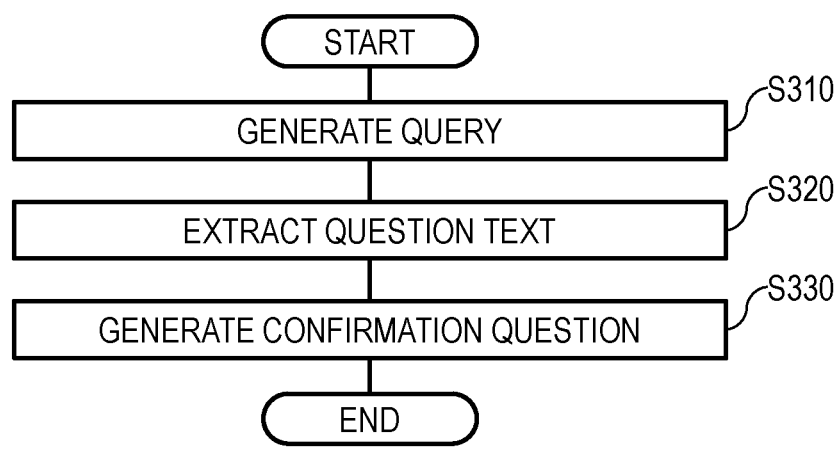
FIG. 12 is a flowchart illustrating operations by the learning assistance apparatus 300.

Hereinafter, a learning assistance apparatus 300 will be described with reference to FIGS. 11 and 12. FIG. 11 is a block diagram illustrating a configuration of the learning assistance apparatus 300. FIG. 12 is a flowchart illustrating operations by the learning assistance apparatus 300. As illustrated in FIG. 11, the learning assistance apparatus 300 includes a query generation unit 310, a question text extraction unit 320, a question generation unit 330, and a recording unit 390. The recording unit 390 is a component that appropriately records information necessary for processes by the learning assistance apparatus 300.

The query generation unit 310 is a component that generates a query from a question creation command, and is configured as the learning assistance apparatus 100 or the learning assistance apparatus 200. Consequently, in the case where the query generation unit 310 is configured as the learning assistance apparatus 100, the recording unit 390 records an English document database and a learning history database, whereas in the case where the query generation unit 310 is configured as the learning assistance apparatus 200, the recording unit 390 records an English document database, a learning history database, and a learning outcome database.

Operations by the learning assistance apparatus 300 will be described in accordance with FIG. 12.

In S310, the query generation unit 310 receives a question creation command including a learner ID indicating the learner for whom confirmation questions are created and a document ID indicating the document to be treated as the basis for creating the confirmation questions as input, and uses the question creation command to generate a query, that is, a learning target created as a confirmation question for the learner corresponding to the learner ID. The query generation unit 310 executes the process from S110 to S160 or the process from S110 to S260 (see FIGS. 2 and 10).

In S320, the question text extraction unit 320 receives the document ID included in the question creation command and the query generated in S160 or S260 as input, and uses the document ID and the query to extract a portion of the document including the query from the document corresponding to the document ID from the English document database, treats the extracted portion as question text, and outputs the question text. Here, the extracted portion of the document may be treated as a page including the query, a paragraph including the query, or a sentence including the query, for example.

In the case where the query is a word, if the word occurs in multiple locations in the document corresponding to the document ID, the locations are extracted as the portion of the document. In the case where the query is the word "underneath", question text having the following three types of grammatical items (meanings) (1) to (3) can be generated, and consequently confirmation questions containing a mix of multiple meanings can be created, enabling the learner to learn that a single word may have a variety of uses and meanings.

(1) preposition (below . . . ): "underneath the table"
(2) adverb (beneath . . . ): "place a paper underneath"
(3) noun (the bottom of . . . ): "the underneath of a plate"

In the case where the query is a grammatical item, if the grammatical item occurs in multiple locations in the document corresponding to the document ID, the locations are extracted as the portion of the document, similarly to the case of a word. For example, in the case where the query is "preposition", a confirmation question can be created for various prepositions in addition to "underneath", such as "above", "on", and "over". Consequently, "underneath" may also not be included in the creation confirmation question.

Also, in the case where the query contains both a word and a grammatical item, locations including the grammatical item are extracted from the document corresponding to the document ID, and from the extracted locations, a location including the word is extracted. In the case where the query is the word "underneath" and the grammatical item "preposition", a location where "underneath" occurs as a preposition is extracted as question text.

In S330, the question generation unit 330 receives the question text extracted in S320 as input, and uses the question text to generate and output a confirmation question. At this point, it is conceivable that the query contains both a word and a grammatical item, and the inputted question text has been obtained by extracting locations including the grammatical item from the document corresponding to the document ID, and extracting a location including the word from the extracted locations. In this case, the confirmation question may be created by blanking out the location of the word corresponding to the query in the question text, and including other words corresponding to the same grammatical item as possible choices. Examples are illustrated below.

Example 1

(Question) Fill in ( ).
(Choices) (a) over (b) underneath (c) beside
(Question text) They lived with their Mother in a sandbank, ( ) the root of a very big fir-tree.

In this question, three words with same part of speech corresponding to the grammatical item (that is, three prepositions) are given as choices, and the question asks the learner to guess the sentence of the question text.

Example 2

(Question) Fill in ( ) to make the sentence mean "Kouyou no shita ni nanika aru" (there is something underneath the red leaves).
(Choices) (a) underneath (b) above (c) within
(Question text) There was something ( ) the red leaves.

In this question, two prepositions other than "underneath" are used as incorrect choices. The prepositions other than "underneath" used as the incorrect choices may be selected randomly every time from among all prepositions. Also, in the case where the learner will wrongly answer a question generated from the same query in the past and the word(s) wrongly selected by the learner may be recorded in a separate database, for example, (1) to lower the difficulty, incorrect choices may be created by excluding the word(s) wrongly selected by the learner, or conversely (2) to raise the difficulty, incorrect choices may be created by including the word(s) wrongly selected by the learner. In this way, choices may be prepared on the basis of questions wrongly answered by the learner in the past. Also, in the case where a question is based on a query that the learner has never answered before, incorrect choices may be prepared on the basis of choices wrongly selected by a large number of learners.

If a record of answers by a large number of learners does not exist in a database, to lower the difficulty, words corresponding to the grammatical item (in this case, prepositions) that occur frequently throughout all of the documents included in the English document database may be selected as incorrect choices. Alternatively, to raise the difficulty, words corresponding to the grammatical item that do not occur frequently throughout all of the documents included in the English document database may be selected as incorrect choices.

(Modification)

In the case where the query includes both words and grammatical items, the question text extraction unit 320 may also receive the document ID included in the question creation command and the query (words and grammatical items) generated in S160 as input, use the document ID and the query to extract a portion of the document including a learning target with a low score from among the words and grammatical items included in the query from the document corresponding to the document ID from the English document database, treat the extracted portion as question text, and output the question text. With this arrangement, in the case where the word with the maximum score is "underneath" and the grammatical item with the maximum score is "tense/aspect (past) (general verb)", for example, it is possible to have the question text include the grammatical item "tense/aspect (past) (general verb)" and have the confirmation question be related to "underneath".

According to the embodiment of the present invention, it is possible to use a learning history to check the level of comprehension by a learner in relation to a learning target.

<Supplement>

Figure 13:
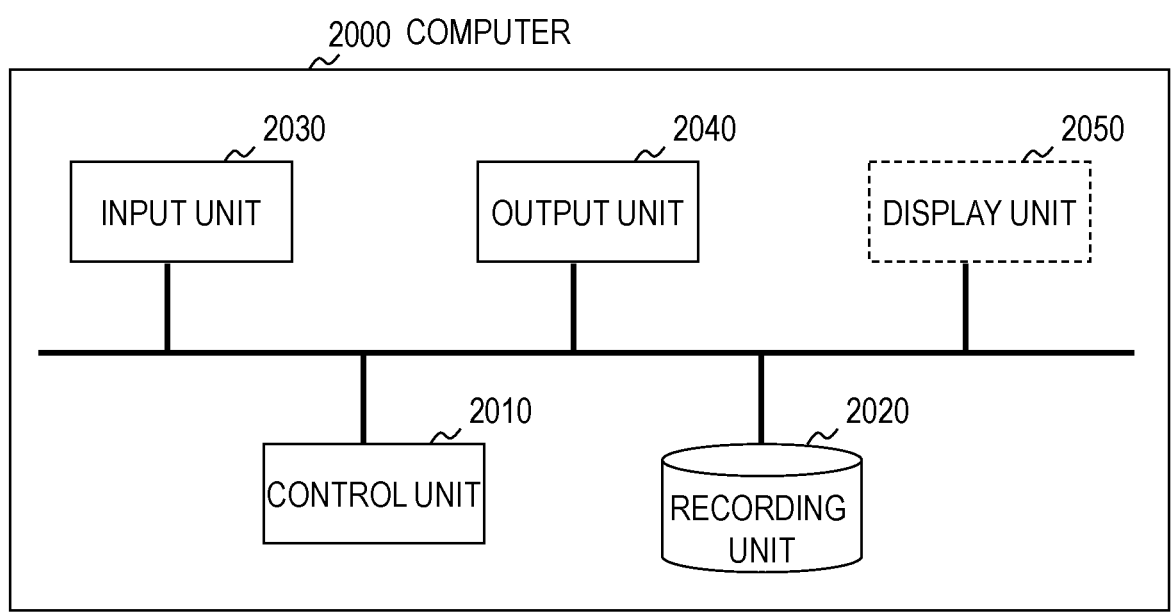
FIG. 13 is a diagram illustrating an example of a functional configuration of a computer that achieves each apparatus according to an embodiment of the present invention.

FIG. 13 is a diagram illustrating an example of a functional configuration of a computer that achieves each apparatus described above. The process in each apparatus described above can be achieved by loading a program for causing a computer to function as each apparatus described above into a recording unit 2020, and causing components such as a control unit 2010, an input unit 2030, and an output unit 2040 to operate.

A apparatus of the present invention includes, as a single hardware entity for example, an input unit connectible to a keyboard or the like, an output unit connectible to a liquid crystal display or the like, a communication unit connectible to a communication device (for example, a communication cable) capable of communicating externally to the hardware entity, a central processing unit (CPU, which may also be provided with cache memory, registers, and the like), memory such as RAM and ROM, an external storage device such as a hard disk, and a bus that interconnects the input unit, output unit, communication unit, CPU, RAM, ROM, and external storage device so as to allow the exchange of data. Additionally, if necessary, the hardware entity may also be provided with a device (drive) capable of reading and writing to a recording medium such as CD-ROM or the like. A general-purpose computer is one example of a physical entity provided with such hardware resources.

Information such as programs necessary for achieving the functions described above and data necessary for the processing by the programs is stored in the external storage device of the hardware entity (but the information is not limited to the external storage device, and may also be stored in the ROM acting as a dedicated storage device for loading programs for example). In addition, information such as data obtained from the processing by the programs is stored appropriately in the RAM, the external storage device, and the like.

In the hardware entity, each program and the data necessary for the processing by each program stored in the external storage device (or the ROM or the like) are loaded into memory as necessary and interpretively executed/processed by the CPU appropriately. As a result, the CPU achieves predetermined functions (each of the components referred to as a unit or means in the above).

The present invention is not limited to the embodiments described above, and appropriate modifications are possible within a scope that does not depart from the gist of the present invention. Also, the processes described in the above embodiments not only may be executed in a time series following the order described, but may also be executed in parallel or individually according to the processing capability of the device executing the process, or as needed.

As described above, in the case where the processing functions of the hardware entity described in the above embodiments (the apparatus of the present invention) are achieved by a computer, the processing content of the functions that the hardware entity should have is stated by a program. Thereafter, by causing the computer to execute the program, the processing functions of the above hardware entity are achieved on the computer.

The program stating the processing content can be recorded to a computer-readable recording medium. The computer-readable recording medium may be any type of medium such as a magnetic recording device, an optical disc, a magneto-optical recording medium, or semiconductor memory, for example. Specifically, for example, a hard disk drive, a flexible disk, or magnetic tape may be used as the magnetic recording device, a DVD (Digital Versatile Disc), DVD-RAM (Random Access Memory), CD-ROM (Compact Disc Read Only Memory), or CD-R(Recordable)/RW (Rewritable) may be used as the optical disc, an MO (Magneto-Optical disc) may be used as the magneto-optical recording medium, and an EEPROM (Electronically Erasable and Programmable-Read Only Memory) may be used as the semiconductor memory.

Also, the program is distributed by selling, transferring, or lending a portable recording medium such as a DVD or CD-ROM on which the program is recorded, for example. Furthermore, the program may also be stored in a storage device of a server computer and distributed by transferring the program from the server computer to another computer over a network.

The computer that executes such a computer first stores the program recorded on the portable recording medium or the program transferred from the server computer in its own storage device, for example. Additionally, when executing processes, the computer loads the program stored in its own storage device, and executes processes according to the loaded program. Also, as a different mode of executing the program, the computer may be configured to load the program directly from the portable recording medium and execute processes according to the program, and furthermore, the computer may be configured to execute processes according to the received program in succession every time the program is transferred to the computer from the server computer. Also, a configuration for executing the processes described above may also be achieved by what is called an ASP (Application Service Provider) type service, in which processing functions are achieved by an execution instruction and a result acquisition only, without transferring the program from the server computer to the computer. Note that the program in this mode is assumed to include accompanying information conforming to the program for processing by an electronic computer (such as data that is not direct instructions to the computer, but has properties that stipulate processing by the computer).

Also, in this mode, the hardware entity is configured by causing the predetermined program to be executed on the computer, but at least a portion of the processing content may also be achieved in hardware.

The above description of embodiments of the invention is presented for the purpose of illustration and description. There is no intention to be exhaustive, nor is there any intention to limit the invention to the exact form disclosed. Modifications and variations are possible from the information described above. The embodiments have been selected and expressed to provide the best illustration of the principles of the invention and to enable those skilled in the art to utilize the invention in various embodiments and with various modifications applied to suit their contemplated and actual use. All such variations and variants are within the scope of the invention as set forth by the appended claims, construed according to the breadth fairly and legally given.

The invention claimed is:

1. A learning assistance apparatus comprising circuitry configured to:
   record an English document database including information for identifying a document (hereinafter referred to as a document ID), a document corresponding to the document ID, and one of either a group of a word and an occurrence frequency of the word on each page of the document corresponding to the document ID or a group of a grammatical item and an occurrence frequency of the grammatical item on each page of the document corresponding to the document ID (hereinafter, the word and the grammatical item are referred to as a learning target), and a learning history database including information for identifying a learner (hereinafter referred to as a learner ID), a document ID indicating a document studied by the learner corresponding to the learner ID, and viewing times for each page of the document corresponding to the document ID viewed by the learner corresponding to the learner ID;
   extract, from the learning history database, the viewing times for each page whose viewing time is non-zero from among the viewing times for each page of the document corresponding to the document ID viewed by the learner corresponding to the learner ID in a question creation command as a learning history, using the question creation command including the learner ID indicating the learner for whom to create a confirmation question and a document ID indicating a document to be used as a basis for creating the confirmation question;
   extract, based on $P_k$ (where k=1, ..., K and K is an integer equal to or greater than 1) being the page in the document corresponding to the document ID included in the learning history groups of a learning target Q(n) included on the pages $P_1, \ldots, P_K$ and a corresponding occurrence frequency R(n) (where n=1, ..., N and N is an integer equal to or greater than 1) from the English document database, using the document ID and the pages $P_1, \ldots, P_K$;
   calculate first occurrence ratio α(n) of the learning target Q(n) on a basis of

[Math. 18]
   $$\alpha(n) = \frac{f(R(n))}{\sum_{n=1}^{N} f(R(n))} \quad (n = 1, \ldots, N)$$

(where f represents a predetermined function for adjusting the occurrence frequency of the learning target), using the groups of the learning target Q(n) and the corresponding occurrence frequency R(n) (where n=1, ..., N);
   calculate, based on $T_k$ (where k=1, ..., K) being the viewing times of the page $P_k$ (where k=1, ..., K) viewed by the learner corresponding to the learner ID in the question creation command, a weighted occurrence frequency R'(n) of the learning target Q(n) (where n=1, ..., N) on a basis of

[Math. 19]
   $$R'(n) = \sum_{k=1}^{K} R'_k(n)$$
   $$R'_k(n) = \begin{cases} R_k(n) \times T_k & (Q(n) \in P_k) \\ 0 & (\text{otherwise}) \end{cases}$$

(where $R_k(n)$ (where k=1, ..., K) is the occurrence frequency of the learning target Q(n) included on the page $P_k$, and $Q(n) \in P_k$ denotes that the learning target Q(n) occurs on the page $P_k$), using the groups of the learning target Q(n) and the corresponding occurrence frequency R(n) (where n=1, ..., N) and the viewing times $T_k$ (where k=1, ..., K),
   calculate a second occurrence ratio β(n) of the learning target Q(n) on a basis of

[Math. 20]
   $$\beta(n) = \frac{R'(n)}{\sum_{n=1}^{N} R'(n)} \quad (n = 1, \ldots, N);$$

calculate one of a difference between the first occurrence ratio α(n) and the second occurrence ratio β(n), an absolute value of the difference between the first occurrence ratio α(n) and the second occurrence ratio β(n), or a ratio of the first occurrence ratio α(n) and the second occurrence ratio β(n) as a score S(n) of the learning target Q(n), using the first occurrence ratio α(n) (where n=1, ..., N) and the second occurrence ratio β(n) (where n=1, ..., N); and
   generate a query by maximizing the score S(n) (where n=1, ..., N) associated with the learning target Q(n) corresponding to the n, wherein the query based on maximizing the score S(n) improves accuracy of querying learning targets in the English document database according to scrutiny of the learning targets to the learner based on the occurrence frequency and the viewing times.

2. A learning assistance apparatus comprising circuitry configured to:
record an English document database including information for identifying a document (hereinafter referred to as a document ID), a document corresponding to the document ID, and one of either a group of a word and an occurrence frequency of the word on each page of the document corresponding to the document ID or a group of a grammatical item and an occurrence frequency of the grammatical item on each page of the document corresponding to the document ID (hereinafter, the word and the grammatical item are referred to as a learning target), a learning history database including information for identifying a learner (hereinafter referred to as a learner ID), a document ID indicating a document studied by the learner corresponding to the learner ID, and viewing times for each page of the document corresponding to the document ID viewed by the learner corresponding to the learner ID, and a learning outcome database including the learner ID and a group of a learning target, a total number of confirmation questions related to the learning target, and a number of questions answered correctly by the learner corresponding to the learner ID from among the confirmation questions;
extract, from the learning history database, the viewing times for each page whose viewing time is non-zero from among the viewing times for each page of the document corresponding to the document ID viewed by the learner corresponding to the learner ID in a question creation command as a learning history, using the question creation command including the learner ID indicating the learner for whom to create a confirmation question and a document ID indicating a document to be used as a basis for creating the confirmation question;
extract, based on $P_k$ (where k=1, ..., K and K is an integer equal to or greater than 1) being the page in the document corresponding to the document ID included in the learning history groups of a learning target $Q(n)$ included on the pages $P_1, ..., P_K$ and a corresponding occurrence frequency $R(n)$ (where n=1, ..., N and N is an integer equal to or greater than 1) from the English document database, using the document ID and the pages $P_1, ..., P_K$;
calculate a first occurrence ratio $\alpha(n)$ of the learning target $Q(n)$ on a basis of

[Math. 21]

$$\alpha(n) = \frac{f(R(n))}{\sum_{n=1}^{N} f(R(n))} \quad (n = 1, ..., N)$$

(where f represents a predetermined function for adjusting the occurrence frequency of the learning target), using the groups of the learning target $Q(n)$ and the corresponding occurrence frequency $R(n)$ (where n=1, ..., N);
calculate, based on $T_k$ (where k=1, ..., K) being the viewing times of the page $P_k$ (where k=1, ..., K) viewed by the learner corresponding to the learner ID in the question creation command, a weighted occurrence frequency $R'(n)$ of the learning target $Q(n)$ (where n=1, ..., N) on a basis of

[Math. 22]

$$R'(n) = \sum_{k=1}^{K} R'_k(n)$$

$$R'_k(n) = \begin{cases} R_k(n) \times T_k & (Q(n) \in P_k) \\ 0 & (\text{otherwise}) \end{cases}$$

(where $R_k(n)$ (where k=1, ..., K) is the occurrence frequency of the learning target $Q(n)$ included on the page $P_k$, and $Q(n) \in P_k$ denotes that the learning target $Q(n)$ occurs on the page $P_k$), using the groups of the learning target $Q(n)$ and the corresponding occurrence frequency $R(n)$ (where n=1, ..., N) and the viewing times $T_k$ (where k=1, ..., K);
calculate a second occurrence ratio $\beta(n)$ of the learning target $Q(n)$ on a basis of

[Math. 23]

$$\beta(n) = \frac{R'(n)}{\sum_{n=1}^{N} R'(n)} \quad (n = 1, ..., N);$$

calculate one of a difference between the first occurrence ratio $\alpha(n)$ and the second occurrence ratio $\beta(n)$, an absolute value of the difference between the first occurrence ratio $\alpha(n)$ and the second occurrence ratio $\beta(n)$, or a ratio of the first occurrence ratio $\alpha(n)$ and the second occurrence ratio $\beta(n)$ as a score $S(n)$ of the learning target $Q(n)$, using the first occurrence ratio $\alpha(n)$ (where n=1, ..., N) and the second occurrence ratio $\beta(n)$ (where n=1, ..., N);
calculate an error probability $E(n)$ of the learning target $Q(n)$ (where n=1, ..., N) from the learner ID in the question creation command and the learning target $Q(n)$ (where n=1, ..., N) using the learning outcome database;
calculate a probability $Pr(n)$ (where n=1, ..., N) of selecting the learning target $Q(n)$ as a query on a basis of

[Math. 24]

$$Pr(n) = \frac{S(n) \times E(n)}{\sum_{n=1}^{N} S(n) \times E(n)} \quad (n = 1, ..., N);$$

and
generate a query based on the learning target selected according to the probability $Pr(n)$ (where n=1, ..., N), wherein the query based on maximizing the score $S(n)$ improves accuracy of querying learning targets in the English document database according to scrutiny of the learning targets to the learner based on the occurrence frequency and the viewing times.

3. The learning assistance apparatus according to claim 1, wherein the calculating the score $S(n)$ further comprises calculating the score $S(n)$ as $S(n)=\beta(n)-\alpha(n)$.

4. The learning assistance apparatus according to claim 1, wherein the calculating the score $S(n)$ further comprises calculating the score $S(n)$ as $S(n)=\alpha(n)-\beta(n)$.

5. The learning assistance apparatus according to claim 1, the circuitry further configured to:
extract a portion of the document, as a question text, using the document ID and the query, wherein the document includes the query from the document corresponding to the document ID from the English document database, and treat the portion as the question text.

6. A learning assistance method comprising:

a recording step to record an English document database including information for identifying a document (hereinafter referred to as a document ID), a document corresponding to the document ID, and one of either a group of a word and an occurrence frequency of the word on each page of the document corresponding to the document ID or a group of a grammatical item and an occurrence frequency of the grammatical item on each page of the document corresponding to the document ID (hereinafter, the word and the grammatical item are referred to as a learning target), and a learning history database including information for identifying a learner (hereinafter referred to as a learner ID), a document ID indicating a document studied by the learner corresponding to the learner ID, and the viewing times for each page of the document corresponding to the document ID viewed by the learner corresponding to the learner ID;

a learning history extraction step to extract, from the learning history database, viewing times for each page whose viewing time is non-zero from among the viewing times for each page of the document corresponding to the document ID viewed by the learner corresponding to the learner ID in a question creation command as a learning history, using the question creation command including a learner ID indicating a learner for whom to create a confirmation question and a document ID indicating a document to be used as a basis for creating the confirmation question;

a learning target extraction step to extract, based on $P_k$ (where k=1, . . . , K and K is an integer equal to or greater than 1) being the page in the document corresponding to the document ID included in the learning history groups of a learning target $Q(n)$ included on the pages $P_1$, . . . , $P_K$ and a corresponding occurrence frequency $R(n)$ (where n=1, . . . , N and N is an integer equal to or greater than 1) from the English document database, using the document ID and the pages $P_1$, . . . , $P_K$;

a first occurrence ratio calculation step to calculate, a first occurrence ratio $\alpha(n)$ of the learning target $Q(n)$ on a basis of

[Math. 25]

$$\alpha(n) = \frac{f(R(n))}{\sum_{n=1}^{N} f(R(n))} \quad (n = 1, \ldots, N)$$

(where f represents a predetermined function for adjusting the occurrence frequency of the learning target), using the groups of the learning target $Q(n)$ and the corresponding occurrence frequency $R(n)$ (where n=1, . . . , N);

a second occurrence ratio calculation step to calculate, based on $T_k$ (where k=1, . . . , K) being the viewing time of the page $P_k$ (where k=1, . . . , K) viewed by the learner corresponding to the learner ID in the question creation command, a weighted occurrence frequency $R'(n)$ of the learning target $Q(n)$ (where n=1, . . . , N) on a basis of

[Math. 26]

$$R'(n) = \sum_{k=1}^{K} R'_k(n)$$

$$R'_k(n) = \begin{cases} R_k(n) \times T_k & (Q(n) \in P_k) \\ 0 & (\text{otherwise}) \end{cases}$$

(where $R_k(n)$ (where k=1, . . . , K) is the occurrence frequency of the learning target $Q(n)$ included on the page $P_k$, and $Q(n) \in P_k$ denotes that the learning target $Q(n)$ occurs on the page $P_k$), using the groups of the learning target $Q(n)$ and the corresponding occurrence frequency $R(n)$ (where n=1, . . . , N) and the viewing times $T_k$ (where k=1, . . . , K), and to calculate a second occurrence ratio $\beta(n)$ of the learning target $Q(n)$ on a basis of

[Math. 27]

$$\beta(n) = \frac{R'(n)}{\sum_{n=1}^{N} R'(n)} \quad (n = 1, \ldots, N);$$

a score calculation step to calculate, one of a difference between the first occurrence ratio $\alpha(n)$ and the second occurrence ratio $\beta(n)$, an absolute value of the difference between the first occurrence ratio $\alpha(n)$ and the second occurrence ratio $\beta(n)$, or a ratio of the first occurrence ratio $\alpha(n)$ and the second occurrence ratio $\beta(n)$ as a score $S(n)$ of the learning target $Q(n)$, using the first occurrence ratio $\alpha(n)$ (where n=1, . . . , N) and the second occurrence ratio $\beta(n)$ (where n=1, . . . , N); and a query generation step to generate a query by maximizing the score $S(n)$ (where n=1, . . . , N) associated with the learning target $Q(n)$ corresponding to the n, wherein the query based on maximizing the score $S(n)$ improves accuracy of querying learning targets in the English document database according to scrutiny of the learning targets to the learner based on the occurrence frequency and the viewing times.

7. A learning assistance method comprising:

a recording step to record an English document database including information for identifying a document (hereinafter referred to as a document ID), a document corresponding to the document ID, and one of either a group of a word and an occurrence frequency of the word on each page of the document corresponding to the document ID or a group of a grammatical item and an occurrence frequency of the grammatical item on each page of the document corresponding to the document ID (hereinafter, the word and the grammatical item are referred to as a learning target), a learning history database including information for identifying a learner (hereinafter referred to as a learner ID), a document ID indicating a document studied by the learner corresponding to the learner ID, and viewing times for each page of the document corresponding to the document ID viewed by the learner corresponding to the learner ID, and a learning outcome database including the learner ID and a group of a learning target, a total number of confirmation questions related to the learning target, and a number of questions answered correctly by the learner corresponding to the learner ID from among the confirmation questions;

a learning history extraction step to extract, from the learning history database, viewing times for each page whose viewing time is non-zero from among the viewing times for each page of the document corresponding to the document ID viewed by the learner corresponding to the learner ID in a question creation command as a learning history, using the question creation command including a learner ID indicating a learner for whom to create a confirmation question and a document ID indicating a document to be used as a basis for creating the confirmation question;

a learning target extraction step to extract, based on $P_k$ (where k=1, ..., K and K is an integer equal to or greater than 1) being the page in the document corresponding to the document ID included in the learning history groups of a learning target Q(n) included on the pages $P_1$, ..., $P_K$ and a corresponding occurrence frequency R(n) (where n=1, ..., N and N is an integer equal to or greater than 1) from the English document database, using the document ID and the pages $P_1$, ..., $P_K$;

a first occurrence ratio calculation step to calculate, a first occurrence ratio α(n) of the learning target Q(n) on a basis of

[Math. 28]

$$\alpha(n) = \frac{f(R(n))}{\sum_{n=1}^{N} f(R(n))} \quad (n = 1, \ldots, N)$$

(where f represents a predetermined function for adjusting the occurrence frequency of the learning target), using the groups of the learning target Q(n) and the corresponding occurrence frequency R(n) (where n=1, ..., N);

a second occurrence ratio calculation step to calculate, based on $T_k$ (where k=1, ..., K) being the viewing times of the page $P_k$ (where k=1, ..., K) viewed by the learner corresponding to the learner ID in the question creation command, a weighted occurrence frequency R'(n) of the learning target Q(n) (where n=1, ..., N) on a basis of

[Math. 29]

$$R'(n) = \sum_{k=1}^{K} R'_k(n)$$

$$R'_k(n) = \begin{cases} R_k(n) \times T_k & (Q(n) \in P_k) \\ 0 & (\text{otherwise}) \end{cases}$$

(where $R_k(n)$ (where k=1, ..., K) is the occurrence frequency of the learning target Q(n) included on the page $P_k$, and $Q(n) \in P_k$ denotes that the learning target Q(n) occurs on the page $P_k$), using the groups of the learning target Q(n) and the corresponding occurrence frequency R(n) (where n=1, ..., N) and the viewing times $T_k$ (where k=1, ..., K), and to calculate a second occurrence ratio β(n) of the learning target Q(n) on a basis of

[Math. 30]

$$\beta(n) = \frac{R'(n)}{\sum_{n=1}^{N} R'(n)} \quad (n = 1, \ldots, N);$$

a score calculation step to calculate, one of a difference between the first occurrence ratio α(n) and the second occurrence ratio β(n), an absolute value of the difference between the first occurrence ratio α(n) and the second occurrence ratio β(n), or a ratio of the first occurrence ratio α(n) and the second occurrence ratio β(n) as a score S(n) of the learning target Q(n), using the first occurrence ratio α(n) (where n=1, ..., N) and the second occurrence ratio β(n) (where n=1, N);

a probability calculation step to calculate, an error probability E(n) of the learning target Q(n) (where n=1, ..., N) from the learner ID and the learning target Q(n) (where n=1, ..., N), using the learning outcome database, and to calculate a probability Pr(n) (where n=1, ..., N) of selecting the learning target Q(n) as a query on a basis of

[Math. 31]

$$Pr(n) = \frac{S(n) \times E(n)}{\sum_{n=1}^{N} S(n) \times E(n)} \quad (n = 1, \ldots, N);$$

and a query generation step to generate a query based on the learning target selected according to the probability Pr(n) (where n=1, ..., N), wherein the query based on maximizing the score S(n) improves accuracy of querying learning targets in the English document database according to scrutiny of the learning targets to the learner based on the occurrence frequency and the viewing times.

8. A non-transitory computer-readable recording medium storing a program causing a computer to function as the learning assistance apparatus according to claim 1.

9. The learning assistance apparatus according to claim 2, wherein the calculating the score S(n) further comprises calculating the score S(n) as S(n)=β(n)−α(n).

10. The learning assistance apparatus according to claim 2, wherein the calculating the score S(n) further comprises calculating the score S(n) as S(n)=α(n)−β(n).

11. The learning assistance apparatus according to claim 2, the circuitry further configured to:

extract portion of the document, as a question text, using the document ID and the query, wherein the document includes the query from the document corresponding to the document ID from the English document database, and treat the portion as the question text.

12. A non-transitory computer-readable recording medium storing a program causing a computer to function as the learning assistance apparatus according to claim 2.

* * * * *